Jan. 25, 1966     E. F. HANSON     3,230,840
FLUID OPERATED DEVICE
Filed May 22, 1963     3 Sheets-Sheet 1
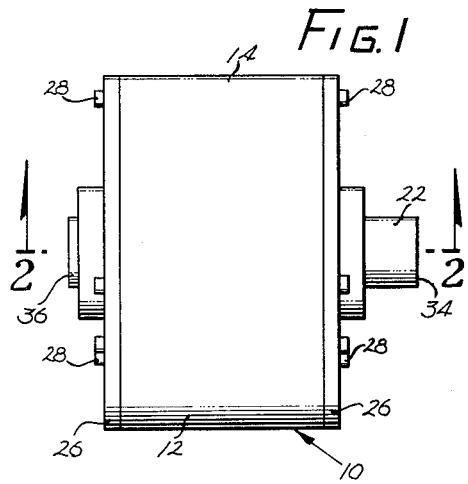
FIG. 1
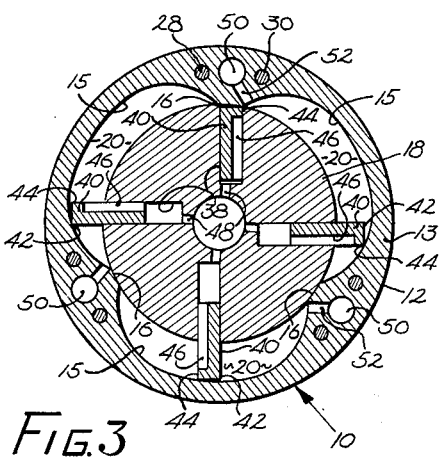
FIG. 3
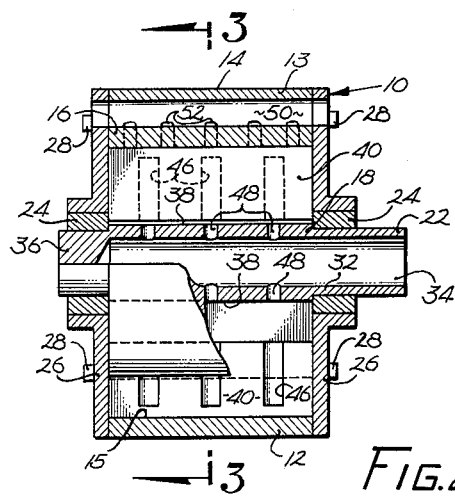
FIG. 2
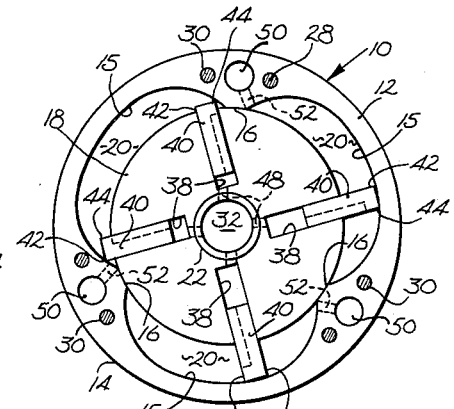
FIG. 4
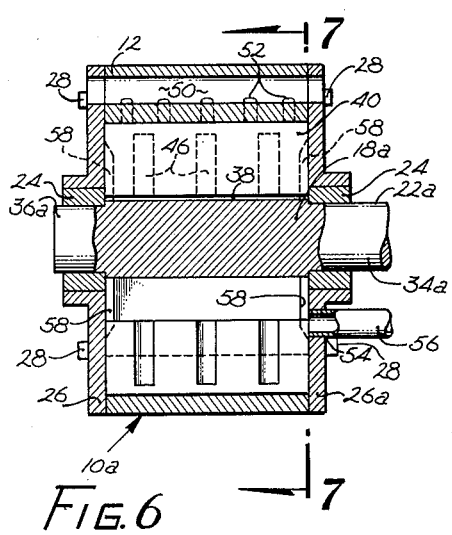
FIG. 6
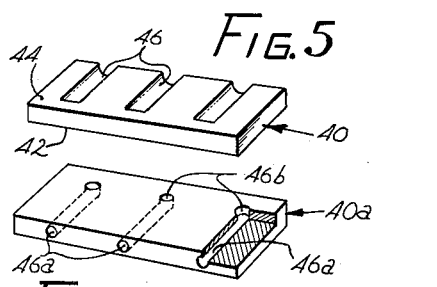
FIG. 5
FIG. 5A
INVENTOR.
ELLIOTT F. HANSON,
BY R. E. Geauque
ATTORNEY

ELLIOTT F. HANSON,
INVENTOR.

BY R. E. Deangue
ATTORNEY

ELLIOTT F. HANSON
INVENTOR.

BY R. E. Leangue

ATTORNEY

United States Patent Office 3,230,840
Patented Jan. 25, 1966

3,230,840
FLUID OPERATED DEVICE
Elliott F. Hanson, 19746 Parthenia St., Northridge, Calif.
Filed May 22, 1963, Ser. No. 282,394
10 Claims. (Cl. 91—137)

This invention relates to fluid operated devices and more particularly to fluid operated motors, brakes, governors and vacuum pumps.

It has long been a problem to provide a fluid operated motor wherein the shaft may be prevented from rotating while the outer casing of the motor rotates.

Another problem has been to provide a fluid operated motor which will operate efficiently with a minimum fluid pressure.

Yet another problem with fluid operated motors, brakes, governors and vacuum pumps resides in the fact that the vanes employed in such devices experience objectionable side pressures when retracting back into their rotors.

Still another problem resides in the fact that it is difficult to produce a satisfactory seal between the vanes and the inner wall of a casing in fluid operated devices when the vanes are under compression.

A further problem resides in the fact that it is rather difficult to maintain a good seal when the device rotates at slow r.p.m.

Therefore, it is one of the objects of the present invention to provide a fluid motor wherein the shaft may be prevented from rotating while the outer casing rotates.

Another object of the present invention is to provide a fluid motor which will operate on a minimum supply of compressed fluid.

Yet another object of the present invention is to provide a fluid motor having vanes offset from the center line of the rotor on the compression side of the fluid motor to soften the thrust of the vanes against the casing by the rotation of the rotor and to minimize the side pressure on the vanes as they retract back into the rotor.

Still another object of the present invention is to provide a fluid motor having an improved seal between the vanes and the inner wall of the casing when the vanes are under compression.

A further object of the present invention is to provide a new and improved fluid motor wherein the vanes act as valves to control the flow of fluid to the compression chamber through a rotor shaft or end cap.

A still further object of the present invention is to provide a new and improved fluid operated device which may be employed as a brake, governor or vacuum pump.

According to a first embodiment of the present invention, a new and improved fluid motor is provided wherein the fluid for operating the motor is admitted through a passageway in the rotor shaft and the vanes are provided with valve slots or bores which control the flow of operating fluid from the passageway to the compression chamber of the motor. The vanes are positioned in slots which are offset from the center line of the rotor in such a manner that the trailing edge of the vane will be in firm contact with the inner wall of the motor casing during the power portion of the angular stroke of the rotor thereby minimizing the chance for fluid under compression to get under the edge of the vane and soften its engagement with the inner wall.

In a second embodiment of the invention, a fluid motor similar to the first embodiment is provided except that the shaft is solid and air is admitted to the motor through a port in the end cap. An air passageway is provided in the rotor beneath the vanes so that the vanes will be urged outwardly into engagement with the inner wall of the casing by air pressure and the vanes are also slotted or bored so that they will serve as valves controlling the flow of the air under pressure from the passageway in the rotor into the compression chamber.

In a third embodiment of the present invention, an air motor is provided which may be identical with the air motor of the first or second embodiments except that the slots which control the flow of operating fluid from the source to the compression chamber are placed in the rotor and the vanes are provided with a flat surface which cooperates with the slots in the rotor to perform the valving action.

In a fourth embodiment of the present invention, the air inlet ports are placed in the shell instead of in the end cap or the shaft, as in the previous embodiments. When the vanes are in an extended position, fluid under pressure flows through valve slots in the rotor, under the vanes, into an air passageway in the rotor and, thence, to the under sides of the vanes that are retracted or partially retracted.

In a fifth embodiment of the present invention, both the air inlet passageway and the exhaust passageway are mounted in a common center shaft of the rotor and the rotor is provided with both inlet ports and exhaust ports. Flow of fluid under pressure into the compression chamber is then controlled by the vanes.

In a sixth embodiment of the present invention, a fluid motor is modified so that it will operate as a brake or a governor. It is constructed in such a manner that operating fluid may be admitted through the rotor shaft to rotate the housing while the shaft remains fixed. The housing turns clockwise pulling cold air from the atmosphere. This air is compressed on the opposite side of the vane causing a heat rise which expands the area, thus raising the pressure. Additional pressure may be obtained by slotting the vanes or by providing them with bores so that air is administered only while the vanes are extended sufficiently to open the slots or bores. Thus, when a vane retracts, the slot or bore in the vane prevents the air from reversing and the air is forced through an exhaust port which is restricted so that the device will operate as a brake or governor. Lubricants or liquids may also be drawn into the chamber through the inlet ports with the cooling air.

In a seventh embodiment of the present invention, a fluid motor is again modified so that it will operate as a brake or governor. In addition, it is very useful as a vacuum pump because means are provided for administering fluids to the exhaust side of the vanes to cool or lubricate them. The housing remains fixed while the shaft and motor assembly rotates.

The features of the present invention which are believed to be novel are set forth with particularity in the appended claims. The present invention, both as to its organization and manner of operation, together with further objects and advantages thereof, may best be understood by referring to the following description, taken in connection with the accompanying drawings, in which:

FIGURE 1 is an elevational view of a first embodiment of a fluid operated device of the present invention;

FIGURE 2 is a longitudinal, cross-sectional view taken along line 2—2 of FIGURE 1;

FIGURE 3 is a transverse, cross-sectional view taken along line 3—3 of FIGURE 2;

FIGURE 4 is a view similar to FIGURE 3 with the parts in a rotated position;

FIGURE 5 is a perspective view of one of the vanes employed in the device of FIGURE 1;

FIGURE 5A is a perspective view of a modified vane of the type shown in FIGURE 5;

FIGURE 6 is a longitudinal cross-sectional view of a second embodiment of the fluid operated device of the present invention;

Figure 7:
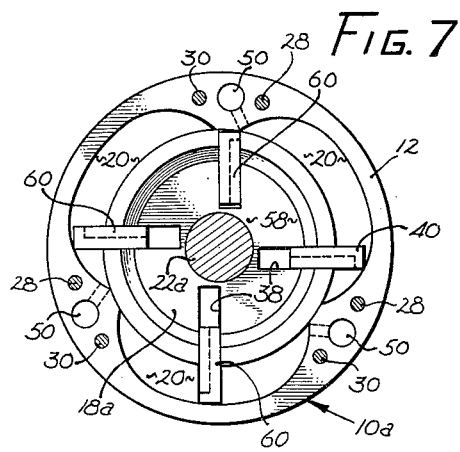
FIGURE 7 is a transverse, cross-sectional view taken along line 7—7 of FIGURE 6.

Referring again to the drawings and particularly to FIGURES 1–5, a fluid operated device constituting the first embodiment of the present invention, generally designated 10, includes a casing 12 having an encompassing sidewall 13 formed with a cylindrical outer periphery 14 and a cam-shaped inner periphery 15. The cam-shaped inner periphery 15 may be formed from a solid stock of material by drilling a first hole through the center of the material and additional holes slightly off the center line leaving a plurality of lobes 16. The lobes 16 extend longitudinally across the casing 12 parallel to its major axis and have arcuate surfaces which center a cylindrical rotor 18 in the casing 12. The outer surface of the rotor 18 and the cam-shaped periphery 15 cooperate to form a plurality of chambers 20 in the casing 12.

The rotor 18 includes a shaft portion 22 which has its ends journaled in bushings 24. The bushings 24 are mounted in end caps 26 which are secured to the ends of casing 12 by means of screws 28 threadedly engaging tapped bores 30 in casing 12. The shaft 22 includes a fluid inlet passageway 32 having an open end 34 forming an inlet port and a closed end 36.

A plurality of slots 38 are formed in rotor 18 in any suitable manner, such as by milling, and extend longitudinally along rotor 18 from one end to the other parallel to the major axis of the rotor 18. The slots 38 are are offset from the centerline of rotor 18 in such a manner that, when vanes 40 are slidably mounted in slots 38, the leading edges 42 of the vanes may be lined up with the approximate centerline of rotor 18 or somewhat downstream thereof and the trailing edges 44 of the vanes may lie somewhat more downstream of the centerline of rotor 18. Each vane 40 is provided with a plurality of valve slots 46 which are in fluid communication with the inlet passageway 32 through a plurality of ports 48 formed in rotor 18 to connect the base of slots 38 with the inlet passageway 32.

A fluid exhaust passageway 50 is formed in each lobe 16 and extends through the casing 12 and the end caps 26. A plurality of exhaust ports 52 place each exhaust passageway 50 in fluid communication with the downstream side of a respective chamber 20.

The fluid operated device 10 may be operated as a fluid motor by either fixing the shaft 22 so that the casing 12 rotates or by fixing the casing 12 so that the shaft 22 rotates. In either case, a fluid under pressure, such as compressed air, is admitted through inlet port 34 into fluid inlet passageway 32 from which it passes through ports 48 into slots 38 beneath the vanes 40.

The compressed air pressurizes the slots 38 below vanes 40 forcing them radially outwardly into engagement with the inner periphery 15 of casing 12. As best seen in FIGURE 3, the valve slots 46 become exposed to chamber 20 as the vanes move radially outwardly so that compressed air is free to flow from slots 38 through valve slots 46 into the chamber 20 on the downstream side of the chamber 20 exerting a force between the upstream sides of lobes 16 and the downstream sides of vanes 40 so that the rotor 18 will turn in a counter clockwise direction, as viewed in FIGURE 3, if the casing is held fast or the casing 12 will rotate in a clockwise direction if the rotor is held fast. Air in the chambers 20 on the upstream sides of the vanes 40 is exhausted from chamber 20 through ports 52 and passageways 50. As the vanes 40 approach the exhaust ports 52, the downstream side of a respective lobe 16 will cam the respective vane 40 radially inwardly towards the bottom of vane slots 38 so that valve slots 46 will close shutting off the supply of compressed air to chamber 20.

Referring now to FIGURES 6 and 7, a fluid operated device constituting a second embodiment of the present invention, generally designated 10a, includes a casing 12 which may be identical with that shown in FIGURES 1–4 and will not be further described. A rotor 18a is rotatably mounted in the casing 12 and includes a shaft 22a having a first end 36a journaled in a bushing 24 in an end cap 26 which may be identical with those shown in FIGURES 1–4. The other end 34a of shaft 22a is in a bushing 24 in an end cap 26a which is modified from the end caps shown in FIGURES 1–4 to include an air inlet port 54 in which an air inlet conduit 56 may be mounted.

The rotor 18a includes slots 38 which may be identical with those shown in the first embodiment of the present invention. However, the rotor 18a is modified from that shown in FIGURES 1–4 by eliminating the passageway in shaft 22a and the ports 48 and providing an annular recess 58 on each end of rotor 18a so that compressed air is free to flow through inlet port 54, recess 58, and into the slots 38 beneath the vanes 40.

The fluid operated device 10a is designed for use in those situations where it is desirable to restrain the casing 12 against rotation while permitting the shaft 22a to rotate. Thus, the shaft 22a may be made of solid material to carry a heavier load because the air inlet port 54 is mounted in the end cap 26a.

Figure 8:
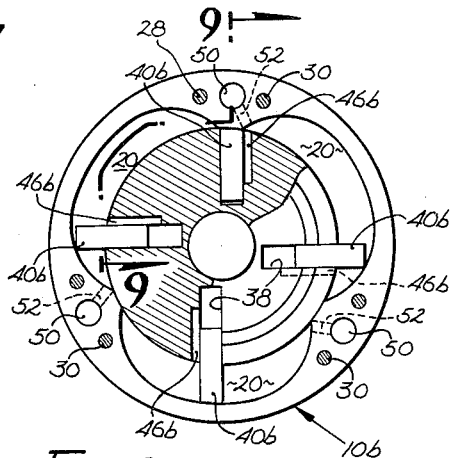
FIGURE 8 is a transverse, cross-sectional view, with parts shown in elevation, of a third embodiment of a fluid operated device of the present invention.
Figure 9:
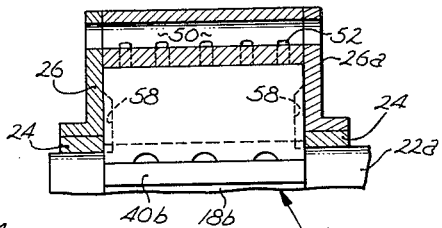
FIGURE 9 is a partial, cross-sectional view taken along line 9—9 of FIGURE 8.

Referring now to FIGURES 8 and 9, a third embodiment of a fluid operated device of the present invention, generally designated 10b, may be identical with the embodiment shown in FIGURES 6 and 7 except that the vanes 40b do not include any valve slots. However, the valve slots 46b are provided in the rotor 18b and cooperate with the vanes 40b to control the flow of fluid from the vane slots 38 to the pressure chambers 20.

Figure 10:
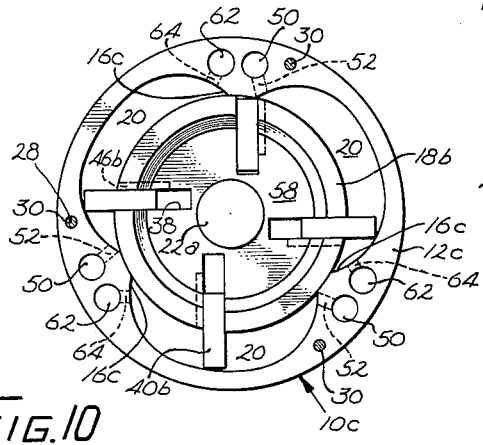
FIGURE 10 is a transverse, cross-sectional view of a fourth embodiment of the fluid operated device of the present invention.

The fourth embodiment of the present invention shown in FIGURE 10, generally designated 10c, is identical with that shown in FIGURES 8 and 9 except that the casing 12c is modified to include air inlet ports 62 which are formed in the lobes 16c and connect the air chambers 20 to a plurality of ports, such as the ones shown at 64. When the vanes 40b are in an extended position, fluid under pressure flows through the valve slots 46b in the rotor 18b, under the vane 40b, into the air passageway 38 in rotor 18b and, thence, to the undersides of the vanes 40b that are retracted or partially retracted.

Figure 11:
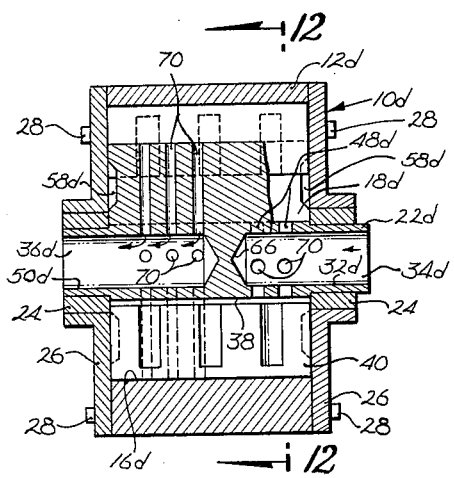
FIGURE 11 is a longitudinal, cross-sectional view of a fifth embodiment of a fluid operated device of the present invention.
Figure 12:
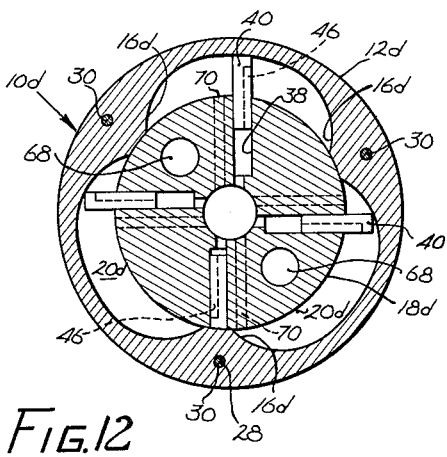
FIGURE 12 is a transverse, cross-sectional view taken along line 12—12 of FIGURE 11.
Figure 13:
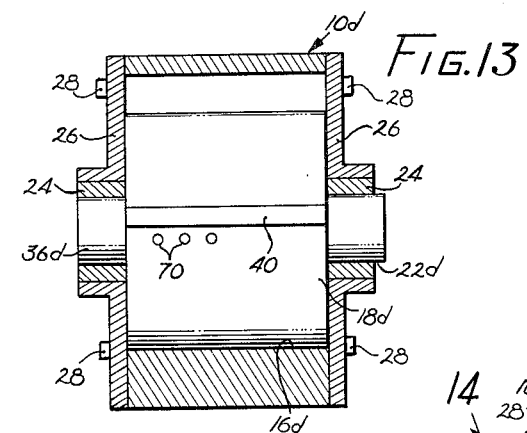
FIGURE 13 is a cross-sectional view, with parts shown in elevation, of the device of FIGURE 11 showing a detail of construction thereof.

Referring now to FIGURES 11–13, a fluid operated device constituting a fifth embodiment of the present invention, generally designated 10d, includes a casing 12d which may be identical with that shown in FIG- URES 1–4 except that the lobes 16d do not include fluid outlet passageways or ports.

The vanes 40 may be identical with those shown in FIGURE 5 of the first embodiment and are slidably mounted in vane slots 38 which are placed in a rotor 18d in a manner identical to those shown in the rotor 18 of FIGURES 1–4.

The rotor 18d includes a shaft 22d having a first open end forming an inlet port 34d and a second open end forming an outlet port 36d. The ends 34d and 36d are journaled in bushings 24 which, in turn, are mounted in end caps 26, all identical with those shown in FIGURES 1–4. The inlet port 34d communicates with a fluid passageway 32d formed by drilling the shaft 22d from the inlet port 34d to slightly less than the midsection of shaft 22d. The outlet port 36d communicates with a fluid outlet passageway 50d formed by drilling the shaft 22d from the outlet port 36d to a depth slightly less than the depth reached by the passageway 32d so that an impervious partition 66 is formed separating the passageways 32d and 36d. An annular air passageway 58d is formed on each end of rotor 18d to provide chambers for compressed air traveling through the slots 38 and are in fluid communication with a pair of passageways 68 which extend through the rotor 18d and serve to balance or equalize the pressure entering the pressure chambers 20d through the ports 48d which communicate with the inlet passageway 32d.

Air is exhausted from the chambers 20d through passageways 70 which are formed in rotor 18d by drilling holes upstream of the vanes 40 and which are in fluid communication with the passageway 50d in shaft 22d.

Figure 15:
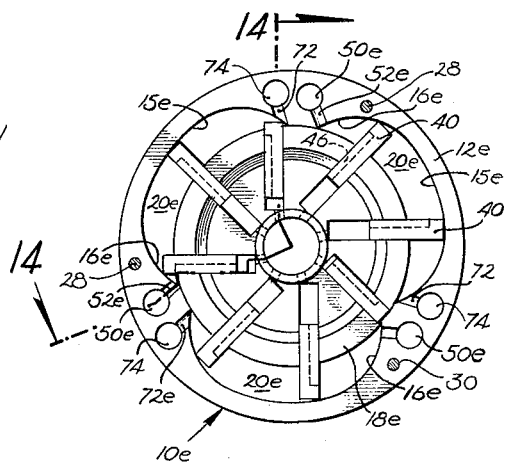
FIGURE 15 is a transverse, cross-sectional view taken along line 15—15 of FIGURE 14.
Figure 14:
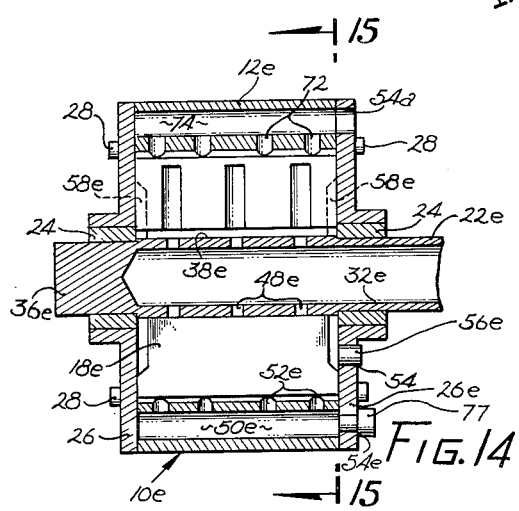
FIGURE 14 is a longitudinal, cross-sectional view taken along line 14—14 of FIGURE 15 of a sixth embodiment of a fluid operated device of the present invention.
Figure 16:
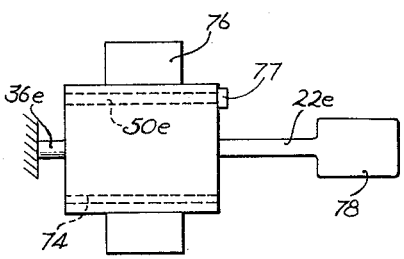
FIGURE 16 is a schematic view of the device of FIGURE 14 in an operating environment.

Referring now to FIGURES 14, 15 and 16, a sixth embodiment of the present invention, generally designated 10e, is designed to operate as a brake or governor and includes a casing 12e having lobes 16e on the downstream sides of which are mounted ports 52e placing air chambers 20e in fluid communication with an exhaust passageway 50e. Ports 72 place the upstream sides of the lobes 16e in fluid communication with chambers 20e and fluid inlet passageways 74. A rotor 18e is rotatably mounted in casing 12e and includes a hollow shaft 22e which is journaled in bushings 24 in a first end cap 26 and a second end cap 26e. Screws 28 engage tapped holes 30 in casing 12e to secure the end caps 26 and 26e thereto. A plurality of vane slots 38e are milled into the rotor 18e and extend longitudinally from end to end thereof. Ports 48e place the base of slots 38e in fluid communication with a fluid inlet passageway 32e in the hollow shaft 22e. A vane 40 is slidably mounted in each vane slot 38e and includes valve slots 46 to control the flow of fluid from the passageway 32e through ports 48e and slots 38e into chambers 20e. It is to be noted that where the slots 46 were placed on the trailing edge of vane 40 in the embodiment of FIGURES 1–4, they are placed on the leading edge of the vanes 40 in the embodiment shown in the FIGURES 14, 15 and 16 for a purpose to be hereinafter mentioned.

The end cap 26e includes a port 54 in which is mounted a plug 56e. The plug 56e may be replaced with a line, not shown, to place chamber 20e in fluid communication with atmosphere through vane slots 38e, ports 48e and annular recesses 58e, which are formed on the ends of rotor 18e. The end cap 26a also includes a port 54a communicating with chamber 74 and a port 54e communicating with chamber 50e. The port 54a is open to atmosphere and the port 54e is partially closed by a restrictor valve 77.

The brake or governor 10e is shown diagrammatically in FIGURE 16 as having an extension on the end 36e of shaft 22e. The extension 36e is anchored and a load 76 is connected to housing 12e to rotate the housing clockwise, as viewed in FIGURE 15. Compressed air may be supplied from a suitable storage tank 78 through the passageway 32e in the shaft 22e to the slots 38e beneath vanes 40 urging them into engagement with the cam-surface 15e of casing 12e. The compressed air will also travel into chamber 20e through slots 46 upstream of the vanes 40 because the slots 46 are facing in a downstream direction and try to drive the casing 12e in a counterclockwise direction, as viewed in FIGURE 15, to resist the driving force of load 76.

As the load 76 drives the housing 12e in a clockwise direction, air in chamber 20e will be compressed by the vane 40 and forced out the ports 52e into the exhaust passageway 50e and through the restrictor valve 77 which controls the flow of compressed air from the chamber 20e. Air is drawn into the passageways 74 from atmosphere through ports 54a and passes into chamber 20e as housing 12e is rotated by load 76. This air is compressed by a following vane in chamber 20e and forced out the exhaust passageway 50e through restrictor valve 77.

Figure 17:
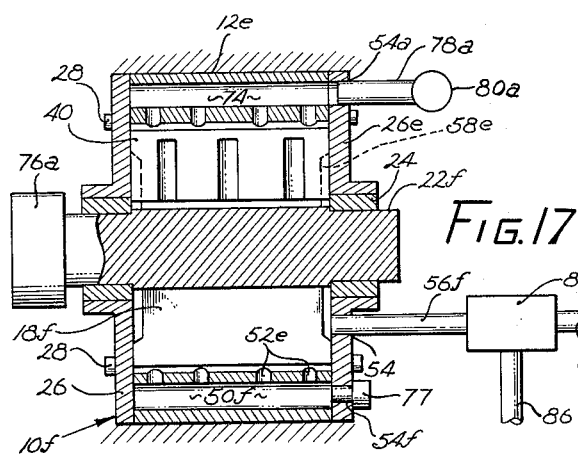
FIGURE 17 is a longitudinal, cross-sectional view of a seventh embodiment of a fluid operated device of the present invention.

Referring to FIGURE 17, a seventh embodiment of the present invention, generally designated 10f, is designed to operate as a brake, governor or vacuum pump and is identical to that shown in FIGURES 14 and 15 except that the shaft 22f is solid and is adapted to be rotated by a load 76a while the casing 12e remains fixed.

A pipe 78a connects port 54a to a container 80a and a pipe 56f connects the port 54 to a selector valve 85. A pipe 86 connects the valve 85 to a vacuum, not shown, and a pipe 88 connects the valve 85 to a source of compressed air, not shown.

When the device 10f is to be operated as a brake or governor, valve 85 will be positioned to admit compressed air to the recess 58e to tend to drive rotor 18f against a load 76a. Compressed air is exhausted through restrictor valve 77, as in the previous embodiment. Fluids may be drawn from container 80a and admitted to the exhaust side of vanes 40 to cool or lubricate them. Water may be admitted from container 80a to form steam and expand. This greatly increases the efficiency of the brake or governor. When the load 76a is not being resisted, valve 85 may be positioned to vacuum through pipe 86 to retract vanes 40 and hold them seated in rotor 18f to minimize wear on the vanes 40.

To operate as a vacuum pump, the container 80a would be evacuated by rotating shaft 22f. The restrictor valve 77 would be opened. Valve 85 is positioned to connect line 88 with port 54 so that a suitable coolant or lubricant such as compressed air or other fluid, may be admitted to recess 58e to cool and lubricate vanes 40. This prevents the device 10f from becoming overheated as the container 80a approaches complete evacuation.

Referring to FIGURE 5A, a modified vane 40a is similar to the vane 40 except that the slots 46 are replaced with bores 46a which may be placed in fluid communication with the chambers 20 in the various embodiments of the invention through apertures 46b. Vanes 40a may be used in all embodiments of the invention where vanes 40 are shown herein.

While the particular fluid operated devices herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

What is claimed is:

1. A fluid operated device comprising:
   a casing member including an encompassing sidewall having a lobe formed on the inner surface thereof;
   a rotor member rotatably mounted concentrically in said casing and forming a fluid chamber with said sidewall and said lobe;
   vane means slidably mounted in slot means in said rotor, said vane means being adapted to cyclically extend into said fluid chamber and retract into said rotor as said rotor moves past said lobe;

fluid inlet passage means connected to said chamber for admitting a fluid under pressure thereto; and fluid outlet passage means connected to said chamber for exhausting fluid therefrom; the central plane of said slot means being offset from the parallel longitudinal plane passing through the axis of said rotor member in the direction of the side of said vane means pressurized through said inlet passage means; said casing member and said rotor member being rotatably mounted relative to each other with one of the members being fixed and the other being driven by the fluid force on said vane means and said lobe.

2. A fluid operated device comprising:

a casing having a bore therein with a plurality of lobes evenly spaced around the inner surface thereof;

a rotor rotatably mounted concentrically in said casing on a shaft and having a plurality of substantially radially extending vane slots therein;

a vane mounted in each of said slots;

a fluid inlet in fluid communication with said vane slots for forcing said vanes into engagement with said casing and for admitting a fluid under pressure to said bore; each of said vanes and slots being offset from a parallel longitudinal plane passing through the axis of said rotor toward the trailing side of said vanes against which the fluid under pressure operates;

a fluid outlet in fluid communication with said bore for exhausting fluid therefrom said casing member and said rotor member being rotatably mounted relative to each other with one of the members being fixed and the other being driven by the fluid force on said vanes and said lobes.

3. The device of claim 2 wherein said fluid outlet comprises an outlet passageway mounted in said shaft and outlet port means mounted in said rotor for placing said outlet passageway in fluid communication with said bore.

4. A fluid motor comprising:

a casing member including an encompassing sidewall having a plurality of lobes mounted on the inner surface thereof;

a rotor rotatably mounted concentrically in said casing on a shaft and forming fluid chambers with said sidewall between said lobes, said rotor having a plurality of substantially radially extending vane slots offset with respect to a longitudinal plane through the rotational axis of said rotor;

a vane slidably mounted in each of said vane slots, each of said vanes comprising valve means for controlling fluid passage means in the vane, said lobes seating said vanes fully in said slots cyclically as said rotor rotates in said casing member;

a fluid inlet passageway in said rotor shaft;

port means connecting said fluid inlet passageway to said vane slots for forcing said vanes radially outwardly against said side wall, said valve means preventing flow of fluid to said chambers when said vanes are fully seated in said vane slots and permitting flow of fluid to said chambers at the downstream side of said vanes after the said vanes have moved radially outwardly a predetermined amount, said offset of said vanes being in the downstream direction from said plane; and fluid outlet means connected to said chambers for exhausting fluid therefrom; said casing member and said rotor member being rotatably mounted relative to each other with one of the members being fixed and the other being driven by the fluid force on said vanes and said lobes.

5. A fluid motor as defined in claim 4 wherein the upstream, leading side of said slots are substantially in a longitudinal plane passing through the axis of said rotor and the downstream trailing side of said slots are displaced from said plane.

6. A fluid motor as defined in claim 5 wherein said fluid inlet passageway comprises passage means in said shaft for supplying fluid to said port means during rotation of either said rotor or of said casing member.

7. A fluid motor as defined in claim 5 wherein said valve means comprises a portion on the outer radial end of each vane having a sliding fit with the slot, the radial length of said portion determining the amount of radial outward movement required to connect fluid in said slot with one of said chambers.

8. A fluid motor as defined in claim 7 wherein said fluid passage means in each of said vanes comprises a cutout area in the downstream side of each vane extending from the radially inward end of the vane to said portion of said valve means.

9. A fluid motor comprising:

a casing having a bore therein with a plurality of lobes evenly spaced around the inner surface thereof;

a rotor concentrically mounted on said casing and contacting said inner surface of said lobes in order to form a plurality of fluid chambers with the inner wall of said casing;

a plurality of substantially radial vane slots in said rotor extending longitudinally of said rotor;

a vane slidably mounted in each of said vane slots, said lobes seating said vanes fully in said slots cyclically during relative rotation between said rotor and said casing;

means for introducing a pressurized fluid to the inner ends of said vane slots to act upon said vanes and force said vanes radially outwardly against the inner surface of said bore;

each of said vanes comprising valve means and fluid passage means, said valve means opening said passage means to one of said chambers after a predetermined amount of outward radial movement of the vane for introducing fluid at the downstream side of the vane;

fluid outlet means in each of said lobes on the upstream side of said vanes for exhausting fluid from said chambers; and said slots being offset from a longitudinal plane through the axis of said rotor in the direction of the side of said vanes receiving the fluid pressure so that the vanes are dragged into the slots by the lobes to prevent excessive pressure on the vanes.

10. A fluid motor as defined in claim 9 wherein each of said vanes has a flat rectangular surface at the outer radial end thereof so that the downstream edge of said surface first engaging the inner bore surface as the vane moves outwardly and the upstream edge of said surface engages the inner bore surface as the vane moves inwardly.

References Cited by the Examiner

UNITED STATES PATENTS

| | | | |
|---|---|---|---|
| 27,148 | 2/1860 | Parsons | 91—136 |
| 141,710 | 8/1873 | Gibson | 91—136 |
| 254,737 | 3/1882 | Wade et al. | 91—136 |
| 560,252 | 5/1896 | Bennett | 91—137 |
| 741,617 | 10/1903 | Bogart | 91—136 |
| 1,093,005 | 4/1914 | Myers | 103—136 |
| 1,321,706 | 11/1919 | Bosch | 103—135 |
| 1,805,063 | 5/1931 | Wrona | 103—136 |
| 2,037,358 | 4/1936 | Amtsberg | 91—136 |
| 2,057,381 | 10/1936 | Kenney et al. | 91—137 |
| 2,612,115 | 9/1952 | Ernst | 103—135 |
| 3,010,545 | 11/1961 | Young | 103—136 |

DONLEY J. STOCKING, *Primary Examiner.*

WILBUR J. GOODLIN, *Examiner.*